C. RUSSELL & W. K. MILLER.
STRAW CARRIER FOR THRESHING MACHINES.
No. 103,086.  Patented May 17, 1870.
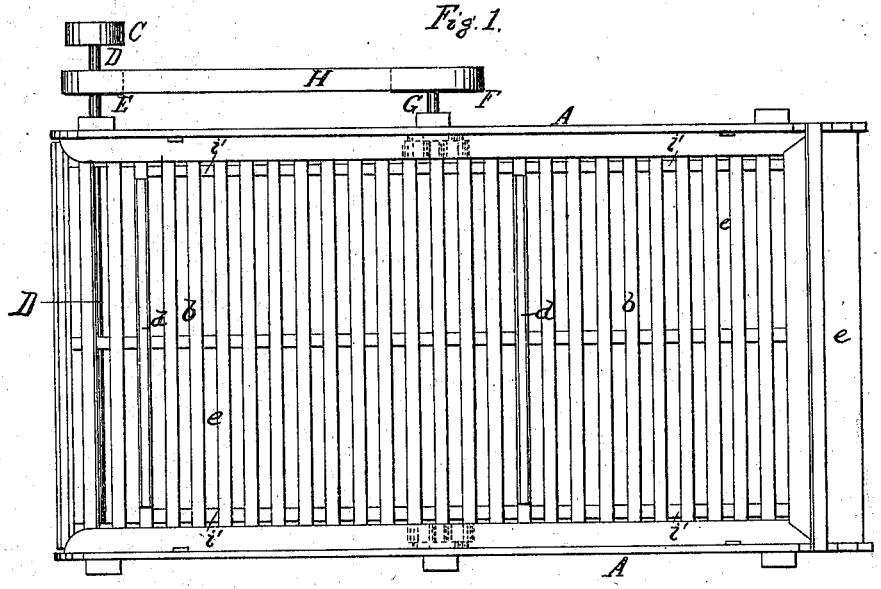
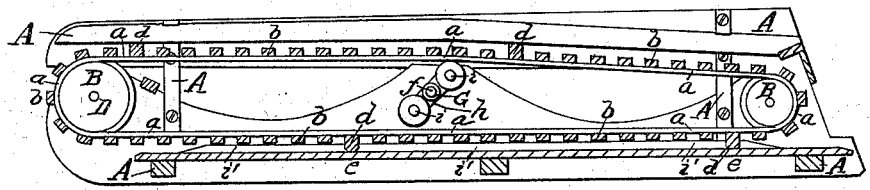
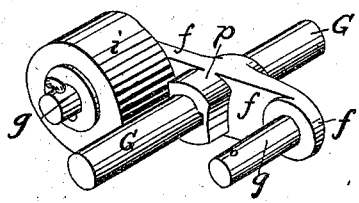
Witnesses
Chas. C. Wilson
Edmund Masson
Inventors
C. Russell & Wm. K. Miller
By A. B. Stoughton atty.

United States Patent Office.

CLEMENT RUSSELL AND WILLIAM K. MILLER, OF MASSILLON, OHIO.

Letters Patent No. 103,086, dated May 17, 1870.

---

IMPROVED STRAW-CARRIER FOR THRASHING-MACHINES.

---

The Schedule referred to in these Letters Patent and making part of the same

---

*To all whom it may concern:*

Be it known that we, CLEMENT RUSSELL and WILLIAM K. MILLER, of Massillon, in the county of Stark and State of Ohio, have invented certain new and useful Improvements in Straw-Carriers for Thrashing and Grain-Separating Machines; and we do hereby declare the following to be a full, clear, and exact description of the same, reference being had to the accompanying drawings making a part of this specification, in which—

Figure 1 represents a top plan of the straw-carrier.

Figure 2 represents a vertical longitudinal section through the same.

Figure 3 represents, on an enlarged scale and detached from the carrier, the shaker-head, for shaking the belt that carries the straw.

Similar letters of reference, where they occur, refer to like parts of the apparatus in all of the figures.

Our invention relates to the combination of a shaker with an endless carrier supported on strips or ribs, and having scraping-slats thereon for separating the grain from the straw, and returning the former to the cleaning operation.

To enable those skilled in the art to make and use our invention, we will proceed to describe the same with reference to the drawings.

A represents the carrier-frame, at each end of which are arranged rollers or pulleys B, over and around which the belts or endless bands $a$ $a$, to which the slats $b$ $b$ $b$ are attached, pass.

One set of the rollers or pulleys may be driven by any first moving power; and through a driving-belt passing therefrom around a pulley, C, and the projecting end of said pulley-shaft D. The other rollers or pulleys move by friction.

On the bottom of the carrier-frame there are strips or ribs $i'$, which support the endless carrier, and raise it slightly above said bottom board.

At intervals along, on the endless carrier, there are slats $d$, which project further from the belts or bands than the slats $b$ do, and which slats $d$, when on the under side of the carrier and moving over the bottom $e$, act as scrapers for drawing back the grain that is shaken out of the straw, and delivering it where it can be subjected to a cleaning operation.

On the shaft D there is a pulley, E, over and around which, and over and around a pulley, F, on the shaft G, passes an endless belt, H, which gives motion to said shaft G.

On this shaft G, and underneath each of the main carrier-belts, are arranged beaters, for striking, raising, and shaking the belt or carrier, so as to shake out what grain may be in the straw carried by it.

These shakers are made of a cast-iron head, $f$, having two journals, $g$ $g$, cast or otherwise fastened to it, and a boss or hub, $h$, which slips onto the shaft G, and keyed thereto.

On the journals $g$ $g$ are placed rollers $i$, of hard wood, or other suitable material, which rollers, as their shaft revolves, strike against the endless carrier, and shake out what grain remains in the straw carried off by it.

Having thus fully described our invention,

What we claim therein as new, and desire to secure by Letters Patent, is—

In combination with an endless carrier, to which a shake motion is imparted by the rollers $i$ $i$, the two sets of strips $b$ $d$, and the side guides $i'$ $i'$, on and between which guides the said strips $b$ $d$ respectively pass, for the purpose of carrying forward the straw, and screening and drawing back the grain, in the manner described and represented.

CLEMENT RUSSELL.
W. K. MILLER.

Witnesses:
WM. MCKENLEY, Jr.,
W. H. WYANT.